United States Patent
Luo et al.

(10) Patent No.: US 12,454,125 B2
(45) Date of Patent: Oct. 28, 2025

(54) METHOD FOR PREPARATION OF A LAMINATE ARTICLE INCLUDING A SILICONE PRESSURE SENSITIVE ADHESIVE ADHERED TO SILICONE RUBBER

(71) Applicant: Dow Silicones Corporation, Midland, MI (US)

(72) Inventors: Binbin Luo, Midland, MI (US); Timothy Mitchell, Clio, MI (US)

(73) Assignee: Dow Silicones Corporation, Midland, MI (US)

( * ) Notice: Subject to any disclaimer, the term of this patent is extended or adjusted under 35 U.S.C. 154(b) by 31 days.

(21) Appl. No.: 18/293,626

(22) PCT Filed: Oct. 25, 2022

(86) PCT No.: PCT/US2022/078617
§ 371 (c)(1),
(2) Date: Jan. 30, 2024

(87) PCT Pub. No.: WO2023/076871
PCT Pub. Date: May 4, 2023

(65) Prior Publication Data
US 2025/0108592 A1    Apr. 3, 2025

Related U.S. Application Data

(60) Provisional application No. 63/335,734, filed on Apr. 28, 2022, provisional application No. 63/274,131, filed on Nov. 1, 2021.

(51) Int. Cl.
*B32B 37/12* (2006.01)
*B32B 5/18* (2006.01)
(Continued)

(52) U.S. Cl.
CPC ............ *B32B 37/1284* (2013.01); *B32B 5/18* (2013.01); *B32B 7/12* (2013.01); *B32B 25/042* (2013.01);
(Continued)

(58) Field of Classification Search
CPC .............. C09J 2483/006; C09J 2483/00; C09J 2301/302; C09J 183/06; C09J 7/38;
(Continued)

(56) References Cited

U.S. PATENT DOCUMENTS 2,431,878 A   12/1947   McGregor et al.
2,644,805 A   7/1953    Martin et al.
(Continued)

FOREIGN PATENT DOCUMENTS

CA   711756   6/1965
CN   101861359   10/2010
(Continued)

OTHER PUBLICATIONS

Technical Datasheet Dowsil™ 7429 PSA Additive.
(Continued)

*Primary Examiner* — Vishal I Patel
(74) *Attorney, Agent, or Firm* — Catherine U. Brown

(57) ABSTRACT

A laminate article includes a silicone pressure sensitive adhesive adhered to a silicone rubber article. A method for fabricating the laminate article is provided.

20 Claims, 2 Drawing Sheets

(51) Int. Cl.
*B32B 7/12* (2006.01)
*B32B 25/04* (2006.01)
*B32B 25/08* (2006.01)
*B32B 25/20* (2006.01)
*B32B 37/26* (2006.01)
*B32B 38/16* (2006.01)
*C09J 7/38* (2018.01)
*C09J 183/06* (2006.01)

(52) U.S. Cl.
CPC ............ *B32B 25/045* (2013.01); *B32B 25/08* (2013.01); *B32B 25/20* (2013.01); *B32B 37/26* (2013.01); *B32B 38/162* (2013.01); *C09J 7/38* (2018.01); *C09J 183/06* (2013.01); *B32B 2037/1261* (2013.01); *B32B 2037/268* (2013.01); *B32B 2266/0214* (2013.01); *B32B 2319/00* (2013.01); *B32B 2383/00* (2013.01); *C09J 2301/302* (2020.08); *C09J 2483/00* (2013.01); *C09J 2483/006* (2013.01)

(58) Field of Classification Search
CPC ............ B32B 2383/00; B32B 2319/00; B32B 2266/0214; B32B 2037/268; B32B 2037/1261; B32B 38/162; B32B 37/26; B32B 25/20; B32B 25/08; B32B 25/045; B32B 25/042; B32B 7/12; B32B 5/18; B32B 37/1284
See application file for complete search history.

(56) References Cited

U.S. PATENT DOCUMENTS

| | | |
|---|---|---|
| 2,676,182 A | 4/1954 | Daudt et al. |
| 2,736,721 A | 2/1956 | Dexter et al. |
| 2,814,601 A | 11/1957 | Currie et al. |
| 2,842,521 A | 7/1958 | Nitzsche et al. |
| 2,857,356 A | 10/1958 | Goodwin, Jr. |
| 3,020,308 A | 2/1962 | Stange et al. |
| 3,050,490 A | 8/1962 | Nitzsche et al. |
| 3,050,491 A | 8/1962 | Nitzsche et al. |
| 3,070,559 A | 12/1962 | Nitzsche et al. |
| 3,070,567 A | 12/1962 | Nitzsche et al. |
| 3,146,799 A | 9/1964 | Fekete et al. |
| 3,177,176 A | 4/1965 | Boot et al. |
| 3,213,048 A | 10/1965 | Boot et al. |
| 3,230,121 A | 1/1966 | Nitzsche et al. |
| 3,231,542 A | 1/1966 | Eisinger et al. |
| 3,296,182 A | 1/1967 | Fekete et al. |
| 3,330,797 A | 7/1967 | Kelly et al. |
| 3,379,607 A | 4/1968 | Foster et al. |
| 3,528,940 A | 9/1970 | Modic |
| 3,929,704 A | 12/1975 | Horning |
| 3,983,298 A | 9/1976 | Hahn et al. |
| 4,309,520 A | 1/1982 | Blizzard |
| 4,371,493 A | 2/1983 | Minuto |
| 4,487,810 A | 12/1984 | Ascarelli et al. |
| 4,584,355 A | 4/1986 | Blizzard et al. |
| 4,591,622 A | 5/1986 | Blizzard et al. |
| 4,611,042 A | 9/1986 | Rivers-Farrell et al. |
| 4,713,405 A | 12/1987 | Koga et al. |
| 4,766,193 A | 8/1988 | Nakasuji et al. |
| 4,774,310 A | 9/1988 | Butler |
| 4,831,070 A | 5/1989 | McInally et al. |
| 4,865,920 A | 9/1989 | Sweet |
| 5,082,706 A | 1/1992 | Tangney |
| 5,100,976 A | 3/1992 | Hamada et al. |
| 5,175,058 A | 12/1992 | Traver |
| 5,248,739 A | 9/1993 | Schmidt et al. |
| 5,607,721 A | 3/1997 | Ulman et al. |
| 5,726,256 A * | 3/1998 | Benson ............ C08G 77/44 525/477 |
| 5,753,720 A | 5/1998 | Nakanishi et al. |
| 5,776,614 A | 7/1998 | Cifuentes et al. |
| 5,777,002 A | 7/1998 | Conway et al. |
| 5,916,981 A | 6/1999 | Cifuentes et al. |
| 5,961,770 A | 10/1999 | Cifuentes et al. |
| 6,576,051 B2 | 6/2003 | Bardman et al. |
| 6,703,120 B1 | 3/2004 | Ko et al. |
| 6,730,397 B2 | 5/2004 | Melancon et al. |
| 6,811,650 B2 | 11/2004 | Takuman et al. |
| 6,991,751 B2 | 1/2006 | Fukushima et al. |
| 7,687,591 B2 | 3/2010 | Bhagwagar et al. |
| 7,759,425 B2 | 7/2010 | Kawakami et al. |
| 7,892,373 B2 | 2/2011 | Urban et al. |
| 7,939,615 B2 | 5/2011 | Ou et al. |
| 8,141,324 B2 | 3/2012 | Carbary et al. |
| 8,178,207 B2 | 5/2012 | Mizuno et al. |
| 8,198,357 B2 | 6/2012 | Jeram et al. |
| 8,247,502 B2 | 8/2012 | Aoki |
| 8,298,367 B2 | 10/2012 | Beger et al. |
| 8,372,936 B2 | 2/2013 | Mizuno et al. |
| 8,501,895 B2 | 8/2013 | Hergenrother et al. |
| 8,535,478 B2 | 9/2013 | Pouchelon et al. |
| 8,580,073 B2 | 11/2013 | Behl et al. |
| 8,754,174 B2 | 6/2014 | Aoki et al. |
| 8,785,507 B2 | 7/2014 | Bloomfield |
| 8,853,332 B2 | 10/2014 | Hasegawa et al. |
| 8,859,693 B2 | 10/2014 | Hasegawa et al. |
| 8,933,187 B2 | 1/2015 | Griswold |
| 9,550,864 B2 | 1/2017 | Bloomfield |
| 9,593,209 B2 | 3/2017 | Dent et al. |
| 9,976,056 B2 | 5/2018 | Nakajima et al. |
| 10,351,742 B2 * | 7/2019 | Brown .................. C09J 183/06 |
| 10,370,499 B2 | 8/2019 | Kumar et al. |
| 10,444,798 B2 | 10/2019 | Choi et al. |
| 10,920,113 B2 | 2/2021 | Park et al. |
| 10,935,700 B2 | 3/2021 | Hashimoto et al. |
| 11,149,175 B2 | 10/2021 | Jang et al. |
| 2007/0148475 A1 | 6/2007 | Sherman et al. |
| 2008/0300358 A1 | 12/2008 | Cook et al. |
| 2009/0061338 A1 | 3/2009 | Wu |
| 2016/0376482 A1 | 12/2016 | Morgeneyer et al. |
| 2017/0200915 A1 | 7/2017 | Lee et al. |
| 2018/0126706 A1 | 5/2018 | Erdogan-Haug et al. |
| 2018/0208799 A1 | 7/2018 | Liu et al. |
| 2020/0071578 A1 | 3/2020 | Huo et al. |
| 2020/0277492 A1 | 9/2020 | Fukui et al. |
| 2021/0062048 A1 | 3/2021 | Galush et al. |
| 2021/0309899 A1 | 10/2021 | Jiang et al. |

FOREIGN PATENT DOCUMENTS

| | | |
|---|---|---|
| CN | 105733497 | 7/2016 |
| CN | 108047449 | 5/2018 |
| CN | 108641615 | 10/2018 |
| EP | 0771862 | 5/1997 |
| EP | 1225211 | 7/2002 |
| EP | 2207840 | 7/2010 |
| EP | 2403915 | 1/2012 |
| JP | 1984155483 | 10/1984 |
| JP | 1986089281 | 6/1986 |
| JP | 2073878 | 3/1990 |
| JP | 2002285130 | 10/2002 |
| JP | 2003327833 | 11/2003 |
| JP | 2006335899 | 12/2006 |
| JP | 2007297598 | 11/2007 |
| JP | 2008024777 | 2/2008 |
| JP | 2009120829 | 6/2009 |
| JP | 2009185256 | 8/2009 |
| JP | 2009203470 | 9/2009 |
| JP | 2010043221 | 2/2010 |
| WO | 2001058972 | 8/2001 |
| WO | 2009054552 | 4/2009 |
| WO | 2009131838 | 10/2009 |
| WO | 2010100037 | 9/2010 |
| WO | 2011039318 | 4/2011 |
| WO | 2013106193 | 1/2014 |
| WO | 2017214675 | 12/2017 |
| WO | 2020032285 | 2/2020 |
| WO | 2020162460 | 8/2020 |

(56) References Cited

FOREIGN PATENT DOCUMENTS

| WO | 2020248181 | 12/2020 |
|----|------------|---------|
| WO | 2021000279 | 1/2021  |
| WO | 2021000280 | 1/2021  |

OTHER PUBLICATIONS

Technical Datasheet Silastic™ MS-1001 Moldable Silicone.
Technical Datasheet Silastic™ MS-1002 Moldable Silicone.
Technical Datasheet Silastic™ MS-1003 Moldable Silicone.
Technical Datasheet Sylgard™ 184 Silicone Elastomer.
Technical Datasheet Xiameter™ RBB-2030-40 Base.
Technical Datasheet Xiameter™ RBB-6660-60 Base.
Test Method 0166 Plasticity and Recovery Jan. 25, 2016.

\* cited by examiner

METHOD FOR PREPARATION OF A LAMINATE ARTICLE INCLUDING A SILICONE PRESSURE SENSITIVE ADHESIVE ADHERED TO SILICONE RUBBER

CROSS REFERENCE TO RELATED APPLICATIONS

This application is a U.S. national stage filing under 35 U.S.C. § 371 of PCT Application No. PCT/US2022/078617 filed on 4 May 2022, currently pending, which claims the benefit of U.S. Provisional Patent Application No. 63/274,131 filed 1 Nov. 2021 under 35 U.S.C. § 119 (e), and U.S. Provisional Patent Application No. 63/335,734 filed 28 Apr. 2022 under 35 U.S.C. § 119 (e). PCT Application No. PCT/US2022/078617 and U.S. Provisional Patent Application Nos. 63/274,131 and 63/335,734 are each hereby incorporated by reference.

FIELD

This invention relates to a method for preparing a silicone pressure sensitive adhesive composition that can be cured to form a silicone pressure sensitive adhesive with good adhesion to silicone rubber. More particularly, this invention relates to a method for preparing a peroxide curable silicone pressure sensitive adhesive composition that cures to form a silicone pressure sensitive adhesive. A laminate article includes the silicone pressure sensitive adhesive adhered to an article comprising silicone rubber.

INTRODUCTION

Current commercially available silicone pressure sensitive adhesives may suffer from the drawback of providing relatively weak adhesion strength to silicone rubber substrates. This relatively weak adhesion may fail to meet the application needs where silicone pressure sensitive adhesives are used to bond to silicone rubbers, such as in electronics, automotive, and masking tape applications.

SUMMARY

A method for fabricating a laminate article is provided. The method comprises:
(a) combining, under conditions to effect condensation reaction, starting materials comprising
  (P) a bis-hydroxyl-terminated polydiorganosiloxane with a weight average molecular weight of 10,000 g/mol to <200,000 g/mol measured by GPC,
  (R) a hydroxyl-functional polyorganosilicate resin with a weight average molecular weight of 15,000 g/mol to 30,000 g/mol measured by GPC,
    where starting materials (R) and (P) and are present in a weight ratio (R)/(P) of 0.65/1 to <3.0/1; and
  (S) a solvent, thereby producing a reaction mixture;
(b) adding (C) a condensation reaction catalyst to the reaction mixture, thereby producing a catalyzed reaction mixture;
(c) mixing the catalyzed reaction mixture at a temperature of 20° C. to 150° C. and removing water;
(d) adding (R') an additional polyorganosilicate resin, thereby forming a silicone pressure sensitive adhesive composition;
(e) coating the silicone pressure sensitive adhesive composition on a surface of a backing substrate,
(f) drying the silicone pressure sensitive adhesive composition,
(g) curing the silicone pressure sensitive adhesive composition to form a silicone pressure sensitive adhesive layer having a surface adhered to the surface of the backing substrate, where the silicone pressure sensitive adhesive layer further comprises an opposing surface opposite the surface of the backing substrate; and
(h) adhering the opposing surface of silicone pressure sensitive adhesive and a surface of a silicone rubber article. A laminate article comprising the silicone pressure sensitive adhesive adhering to the silicone rubber article can be prepared by the method.

REFERENCE NUMERALS

Figure 1:
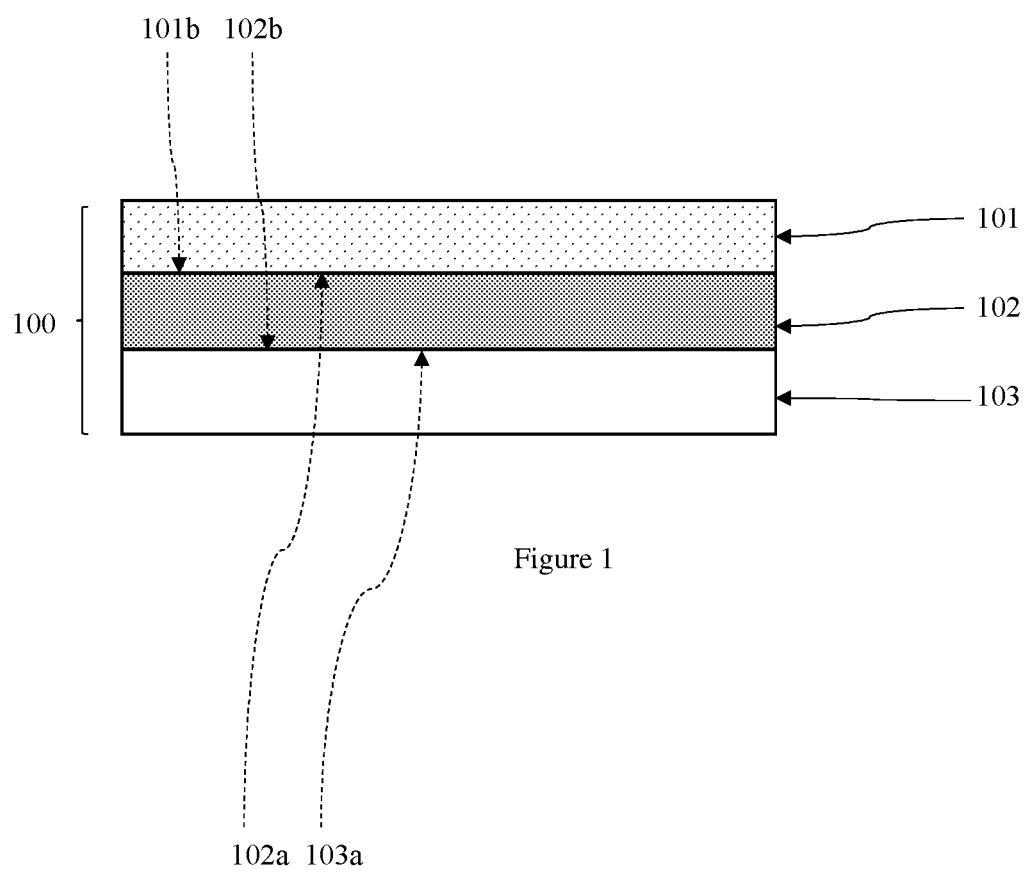
FIG. 1 shows a partial cross section of a laminate article 100.

100 partial cross section of a laminate article
101 backing substrate
101*b* surface of backing substrate 101
102 silicone pressure sensitive adhesive
102*a* surface of silicone pressure sensitive adhesive 102
102*b* opposing surface of silicone pressure sensitive adhesive 102
103 silicone rubber article
103*a* surface of silicone rubber article 103
200 partial cross section of a laminate article
201 backing substrate comprising a silicone rubber
201*b* surface of backing substrate 201
202 silicone pressure sensitive adhesive
202*a* surface of silicone pressure sensitive adhesive 202
202*b* opposing surface of silicone pressure sensitive adhesive 202

DETAILED DESCRIPTION

A method for fabricating a laminate article comprises:
(1) combining, under conditions to effect condensation reaction, starting materials comprising
  (P) a bis-hydroxyl-terminated polydiorganosiloxane with a weight average molecular weight of 10,000 g/mol to <200,000 g/mol measured by GPC, where starting material (P) is present in an amount of >20.5 weight % based on combined weights of starting materials (P) and (R);
  (R) a hydroxyl-functional polyorganosilicate resin with a weight average molecular weight of 15,000 g/mol to 30,000 g/mol measured by GPC, where starting material (R) is present in an amount <79.5 weight %, based on combined weights of starting materials (P) and (R);
  (S) a solvent; and
  optionally (N) a neutralizer; where
  starting materials (R) and (P) and are present in a weight ratio (R)/(P) of 0.65/1 to <3.0/1; thereby producing a reaction mixture; and
(2) adding (C) a condensation reaction catalyst to the reaction mixture, thereby producing a catalyzed reaction mixture;
(3) mixing the catalyzed reaction mixture at a temperature of 20° C. to 150° C. and removing water, thereby forming a reaction product comprising a condensation reaction product of (P) and (R);

optionally (4) recovering the condensation reaction product of (P) and (R);

(5) adding, to the condensation reaction product, (R') an additional polyorganosilicate resin with a weight average molecular weight of 5,500 g/mol to 30,000 g/mol measured by GPC in an amount sufficient to provide a $(R^{tot})/(P)$ ratio to 2.27/1 to <3.88/1 where $R^{tot}$ represents a sum of the amount of (R') and amount of (R) from step (1) and with the proviso that $(R^{tot})/(P)$>(R)/(P);

optionally (6) adding up to 4 weight %, based on combined weights of (R), (R'), and (P), of (X) a peroxide crosslinking agent, thereby forming a silicone pressure sensitive adhesive composition;

optionally (7) treating a surface of a backing substrate;

(8) coating the silicone pressure sensitive adhesive composition on the surface of the backing substrate;

(9) drying the silicone pressure sensitive adhesive composition;

(10) curing the silicone pressure sensitive adhesive composition to form a silicone pressure sensitive adhesive layer having a surface adhered to the surface of the backing substrate, where the silicone pressure sensitive adhesive layer further comprises an opposing surface opposite the surface of the backing substrate;

optionally (11) treating a surface of a silicone rubber article; and

(12) adhering the opposing surface of silicone pressure sensitive adhesive and the surface of the silicone rubber article.

Step (1) of the method described above may be performed by any convenient means, such as mixing starting materials comprising (P), (R), (S), and optionally (N) as introduced above and described in detail below, in a batch reactor, optionally with an agitator and jacketing. The condensation reaction may be performed at a temperature of at least 20° C., alternatively at least RT, while at the same time the condensation reaction may be performed at a temperature up to 145° C., alternatively up to 150° C. Alternatively, temperature may be 20° C. to 150° C., alternatively 20° C. to 145° C., and alternatively RT to the reflux temperature of starting material (S), the solvent. The time for reaction depends on various factors including the selection of starting materials and the temperature, however, condensation reaction in step (1) may be performed in, e.g., 0.5 hour to 20 hours, alternatively 1 hour to 10 hours. The condensation reaction may be performed as described, for example, in U.S. Pat. No. 5,916,981 to Cifuentes, et al., by varying the appropriate starting materials to those described below.

(P) Bis-Hydroxyl Terminated Polydiorganosiloxane

Starting material (P) is the bis-hydroxyl terminated polydiorganosiloxane (Polymer) used in step (1). This Polymer may have formula

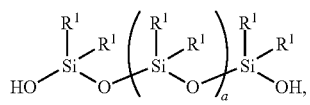

where each $R^1$ is an independently selected alkyl group of 1 to 6 carbon atoms, and subscript a represents average number of difunctional siloxane units per molecule, and 250≤a≤3,000, alternatively 270≤a≤2,000. Alternatively, subscript a may be at least 250, alternatively at least 270, alternatively at least 300, alternatively, at least 350, alternatively at least 400, alternatively at least 450, and alternatively at least 500, while at the same time, subscript a may be up to 3,000, alternatively up to 2,500, alternatively up to 2,100, alternatively up to 2,000, alternatively up to 1,900, and alternatively up to 1,800. Alternatively, subscript a may have a value sufficient to give the Polymer a Mw of at least 20,000 g/mol, alternatively at least 40,000 g/mol, while at the same time subscript a may be sufficient to give the Polymer a Mw<200,000 g/mol, alternatively up to 150,000 g/mol, and alternatively up to 135,000 g/mol. Examples of alkyl groups for $R^1$ include methyl, ethyl, propyl (including n-propyl and isopropyl), butyl (including n-butyl, tert-butyl, sec-butyl, and isobutyl), pentyl (including n-pentyl, cyclopentyl, and branched isomers with 5 carbon atoms), and hexyl (including n-hexyl, cyclohexyl, and branched isomers with 6 carbon atoms). Alternatively, each $R^1$ may be methyl or ethyl; alternatively methyl.

Suitable Polymers for starting material (A) are known in the art and are commercially available from various sources, such as Gelest Inc. of Morrisville, Pennsylvania, USA, and DSC. Examples of suitable Polymers include bis-hydroxyl terminated polydimethylsiloxanes with Mw of 20,000 g/mol to 150,000 g/mol; alternatively, 40,000 g/mol to 135,000 g/mol, where Mw can be measured by GPC.

(R) Polyorganosilicate Resin

Starting material (R) is the hydroxyl-functional polyorganosilicate resin (Resin) used in step (1). The Resin comprises monofunctional units of formula $R^1_3SiO_{1/2}$ and tetrafunctional silicate units ("Q" units) of formula $SiO_{4/2}$, where $R^1$ is as described above. Alternatively, the monofunctional units may be exemplified by M units of formula $(Me_3SiO_{1/2})$. The polyorganosilicate resin is soluble in solvents such as those described below as starting material (S), exemplified by aliphatic and/or aromatic hydrocarbons, such as benzene, toluene, xylene, ethyl benzene, heptane, and combinations thereof.

When prepared, the Resin comprises the monofunctional and tetrafunctional units described above, and the Resin further comprises units with silicon bonded hydroxyl groups and may comprise neopentamer of formula $Si(OSiR^1_3)_4$, where $R^1$ is as described above, e.g., the neopentamer may be tetrakis(trimethylsiloxy) silane. The concentration of silanol groups present in the Resin may be determined using FTIR spectroscopy according to ASTM Standard E-168-16. Molar ratio of monofunctional and tetrafunctional units, where said ratio is expressed as {M(resin)}/{Q(resin)}, or M:Q, excluding monofunctional and tetrafunctional units from the neopentamer. M:Q ratio represents the molar ratio of the total number of triorganosiloxy groups (monofunctional units) of the resinous portion of the polyorganosilicate resin to the total number of silicate groups (Q units) in the resinous portion. M:Q ratio may be 0.5:1 to 1.5:1.

The Mn of the polyorganosilicate resin depends on various factors including the types of alkyl groups represented by $R^1$ that are present. The Mn of the polyorganosilicate resin refers to the number average molecular weight measured using GPC, when the peak representing the neopentamer is excluded from the measurement. The Mn of the polyorganosilicate resin may be greater than 3,000 g/mol, alternatively >3,000 to 8,000 g/mol. Alternatively, Mn of the polyorganosilicate resin may be 3,500 to 8,000 g/mol. The Mw of the polyorganosilicate resin refers to the weight average molecular weight measured using GPC. The Mw of the polyorganosilicate resin may be 15,000 g/mol to 30,000 g/mol; alternatively 20,000 g/mol to 30,000 g/mol, and alternatively 21,000 g/mol to 29,500 g/mol.

The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having monofunctional units and Q units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^1_3SiX^1$, where $R^1$ is as described above and $X^1$ represents a hydrolyzable substituent such as hydroxyl. Silanes with four hydrolyzable substituents may have formula $SiX^2_4$, where each $X^2$ is halogen, alkoxy or hydroxyl. Suitable alkali metal silicates include sodium silicate.

The Resin selected for starting material (R) may have unit formula $(R^1_3SiO_{1/2})_b(SiO_{4/2})_c(HO_{1/2})_d$, where each $R^1$ is an independently selected alkyl group of 1 to 6 carbon atoms as described above, subscripts b and c represent mole fractions of monofunctional and tetrafunctional units, respectively, and subscripts b and c have values such that $0.4 \le b \le 0.5$, $0.5 \le c \le 0.6$, and a quantity (b+c)=1; subscript d represents a quantity of hydroxyl groups in the Resin, and subscript d has a value sufficient to provide the Resin with a hydroxyl content of 2 weight % to 5 weight %. The Resin may have Mw of 15,000 g/mol to 30,000 g/mol measured by GPC. Alternatively, the Resin may have Mw of 20,000 g/mol to 30,000 g/mol, alternatively 21,000 g/mol to 30,000 g/mol, alternatively 21,000 g/mol to 29,500 g/mol, and alternatively 21,000 g/mol to 29,100 g/mol. Suitable Resins are known in the art and are commercially available, e.g., from DSC.

The Resin (R) and Polymer (P) are present in a weight ratio (R)/(P) of 0.65/1 to <3.0/1. Alternatively, (R)/(P) may be 0.65/1 to 1.82/1, alternatively 1/1 to 1.82/1, and alternatively (R)/(P) may be 1/1 to 1.46/1. Alternatively, (R)/(P) may be 0.65/1 to <2.27/1.

(S) Solvent

Starting material (S) is a solvent. The solvent may be added during step (1) and optionally a later step, e.g., step (2), to facilitate introduction of certain starting materials, such as (R) the Resin. Solvents that can be used herein are those that help fluidize the starting materials but essentially do not react with the starting materials. The solvent may be selected based on solubility the starting materials and volatility of the solvent. The solubility refers to the solvent being sufficient to dissolve and/or disperse a starting material. Volatility refers to vapor pressure of the solvent. Without wishing to be bound by theory, it is thought that if the solvent is too volatile (having too high vapor pressure) the solvent may volatilize out of the reaction mixture during step (3) too quickly. However, if the solvent is not volatile enough (too low vapor pressure) too much of the solvent may remain in the condensation reaction product prepared in step (3) and/or water produced as a side product of the condensation reaction may be insufficiently removed during step (3), and when present, step (4).

Suitable solvents include polyorganosiloxanes with suitable vapor pressures, such as hexamethyldisiloxane, octamethyltrisiloxane, hexamethylcyclotrisiloxane and other low molecular weight polyorganosiloxanes, such as 0.5 to 1.5 cSt DOWSIL™ 200 Fluids and DOWSIL™ OS FLUIDS, which are commercially available from DSC.

Alternatively, the solvent may comprise an organic solvent. The organic solvent can be a ketone such as acetone, methylethyl ketone, or methyl isobutyl ketone; an aromatic hydrocarbon such as benzene, toluene, ethylbenzene or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride; chloroform; dimethyl sulfoxide; dimethyl formamide, acetonitrile; tetrahydrofuran; white spirits; mineral spirits; naphtha; n-methyl pyrrolidone; or a combination thereof.

The amount of solvent will depend on various factors including the type of solvent selected and the amount and type of other starting materials selected for use in the method. However, the amount of solvent may range from 1% to 99%, alternatively 2% to 90%, based on the weight of all starting materials in step (1). All or a portion of the solvent may optionally be removed during and/or after step (3). For example, water may form as a side product of the condensation reaction in steps (2) and (3). To progress the reaction, some or all of the water may be removed, e.g., via azeotropic distillation with the solvent.

(N) Neutralizing Agent

Starting material (N), the neutralizing agent, is optional. The neutralizing agent may comprise a silyl phosphate. Without wishing to be bound by theory, it is thought that the neutralizing agent may be added to scavenge impurities in (R) the Resin and/or (P) the Polymer, described above, before condensation reaction thereof. The neutralizing agent may be, for example, a silyl phosphate. Silyl phosphates, such as bis(trimethylsilyl) hydrogen phosphate, are commercially available from DSC.

The amount of neutralizing agent depends on various factors including the type of (P) the Polymer and (R) the Resin selected, however, the amount of neutralizer may be 0.005% to 0.02% based on combined weights of starting materials (P), (R), (C), and (N).

(C) Condensation Reaction Catalyst

Starting material (C) added in step (2) is a condensation reaction catalyst that can catalyze condensation reaction of the hydroxyl groups of (P) the Polymer and (R) the Resin, described above. The condensation reaction catalyst is not specifically restricted and may comprise an acid, or a base condensation reaction catalyst. For example, suitable base catalysts include metal hydroxides such as lithium hydroxide, sodium hydroxide, potassium hydroxide and calcium hydroxide, carbonates such as sodium carbonate and potassium carbonate, bicarbonates such as sodium bicarbonate and potassium bicarbonate, metal alkoxides such as sodium methoxide and potassium butoxide, organometallic compounds such as butyl lithium, potassium silanolate, and nitrogen compounds such as ammonia gas, ammonia water, methylamine, trimethylamine and triethylamine. Alternatively, the condensation reaction catalyst may be an acid, e.g., organic acids such as acetic acid, benzoic acid, octanoic acid and citric acid, and mineral acids such as hydrochloric acid, sulfuric acid and phosphoric acid, are suitable. Alternatively, the condensation reaction catalyst may be an acid catalyst, such as an organic acid, e.g., benzoic acid.

Suitable condensation reaction catalysts are commercially available from various sources, e.g., Sigma Aldrich, Inc. of St. Louis, Missouri, USA and Acros. The amount of catalyst depends on various factors including the type of catalyst select and the temperature for step (1), however, the amount of catalyst may be 0.1% to 0.5% based on combined weights of starting materials (P), (R), (C), and (N).

Step (4) in the method described above is optional. After a condensation reaction product of (P) the Polymer and (R) the Resin forms, the condensation reaction product may further comprise unreacted starting materials, solvent, and water as a side product. In step (4), the condensation reaction product may be recovered, e.g., the solvent, water, and unreacted starting materials may be removed, e.g., by distillation and/or stripping optionally with heating and/or reduced pressure. The condensation reaction product may also be referred to as a bodied resin.

In step (5) of the method described above, (R') an additional polyorganosilicate resin is combined with the condensation reaction product (i.e., the bodied resin). Step (5) may be performed after step (3). Alternatively, when step (4) is present, step (5) may be performed after step (4). Step (5) may be performed by any convenient means, such as mixing, e.g., under ambient conditions. For example, (R') the additional polyorganosilicate resin may (optionally) be dissolved in a solvent (which may be a solvent as described above for starting material (S)). The additional polyorganosilicate resin and the condensation reaction product may then be mixed at RT or elevated temperature. Starting material (R'), the additional polyorganosilicate resin, may be added to the same vessel used for steps (1) to (3), and when present (4), as described above. Step (5) produces a resin/polymer blend.

(R') Additional Polyorganosilicate Resin

The additional polyorganosilicate resin added in step (5) may be prepared by the methods described above for starting material (R) by varying appropriate starting materials such that the Mw of (R') the additional polyorganosilicate resin may be 5,500 g/mol to 30,000 g/mol. The additional polyorganosilicate resin may be selected from the group consisting of (R'-1) a capped resin, (R'-2) an uncapped resin, and (R'-3) a combination of both (R'-1) the capped resin and (R'-2) the uncapped resin. Alternatively, (R') the additional polyorganosilicate resin may be (R'-2) the uncapped resin or (R'-3) a combination of both (R'-1) the capped resin and (R'-2) the uncapped resin. Alternatively, (R') the additional resin may be (R'-2) the uncapped resin. The additional polyorganosilicate resin may comprise monofunctional units of formula $R^1_3SiO_{1/2}$ and tetrafunctional silicate units ("Q" units) of formula $SiO_{4/2}$, where $R^1$ is as described above. Alternatively, the monofunctional units may have formula $R^M_3SiO_{1/2}$, where each $R^M$ is independently select monovalent hydrocarbon group, such as an alkyl group (e.g., as described above for $R^1$), an alkenyl group (e.g., vinyl, allyl or hexenyl), or an aryl group (e.g., phenyl, tolyl, or xylyl). Alternatively, at least one-third, alternatively at least two thirds of the $R^M$ groups are alkyl groups (e.g., methyl groups). Alternatively, the monofunctional units may be exemplified by $(Me_3SiO_{1/2})$ and $(Me_2PhSiO_{1/2})$.

When prepared, the additional polyorganosilicate resin comprises the monofunctional and Q units described above and units with silicon bonded hydroxyl groups. The additional polyorganosilicate resin may further comprise neopentamer of formula $Si(OSiR^M_3)_4$, where $R^M$ is as described above, e.g., the neopentamer may be tetrakis(trimethylsiloxy) silane. $^{29}Si$ NMR spectroscopy may be used to measure hydroxyl content and molar ratio of monofunctional and Q units, where said ratio is expressed as {M (resin)}/{Q (resin)}, excluding monofunctional and Q units from the neopentamer. M:Q ratio represents the molar ratio of the total number of triorganosiloxy groups (monofunctional units) of the resinous portion of the polyorganosilicate resin to the total number of silicate groups (Q units) in the resinous portion. M:Q ratio may be 0.5:1 to 1.5:1.

The Mn of the additional polyorganosilicate resin depends on various factors including the types of hydrocarbon groups represented by $R^M$ that are present. The Mn of the additional polyorganosilicate resin refers to the number average molecular weight measured using GPC, when the peak representing the neopentamer is excluded from the measurement. The Mw of the additional polyorganosilicate resin refers to the weight average molecular weight measured using GPC, which may be 5,500 g/mol to 30,000 g/mol; alternatively 15,000 g/mol to 30,000 g/mol, and alternatively 21,000 g/mol to 29,500 g/mol. The additional polyorganosilicate resin may have a silanol content of 0.5 wt % to 5 wt %, alternatively 3 wt % to 5 wt %.

U.S. Pat. No. 8,580,073 at col. 3, line 5 to col. 4, line 31, and U.S. Patent Publication 2016/0376482 at paragraphs to are hereby incorporated by reference for disclosing MQ resins, which are suitable additional polyorganosilicate resins for use herein. The additional polyorganosilicate resin can be prepared by any suitable method, such as cohydrolysis of the corresponding silanes or by silica hydrosol capping methods. The additional polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having monofunctional units and Q units. The resulting copolymers generally contain from 2 to 5 percent by weight of hydroxyl groups.

The intermediates used to prepare the additional polyorganosilicate resin may be triorganosilanes and silanes with four hydrolyzable substituents or alkali metal silicates. The triorganosilanes may have formula $R^{M3}SiX^1$, where $R^M$ is as described above and $X^1$ represents a hydrolyzable substituent such as halogen, alkoxy, acyloxy, hydroxyl, oximo, or ketoximo; alternatively, halogen, alkoxy or hydroxyl. Silanes with four hydrolyzable substituents may have formula $SiX^2_4$, where each $X^2$ is halogen, alkoxy or hydroxyl. Suitable alkali metal silicates include sodium silicate.

The additional polyorganosilicate resin prepared as described above is an uncapped resin, which typically contains silicon bonded hydroxyl (silanol) groups. The additional polyorganosilicate resin may comprise 3 wt % to 10 wt % of silicon bonded hydroxyl groups, alternatively 3% to 5%, as measured by NMR spectroscopy, as described above. For certain applications, it may desirable for the amount of silicon bonded hydroxyl groups to be ≤2 wt %, alternatively <0.7 wt %, alternatively 0.5 wt %, alternatively less than 1 wt %, and alternatively 0.5 wt % to 5 wt %. Silicon bonded hydroxyl groups formed during preparation of the additional polyorganosilicate resin can be converted to trihydrocarbon siloxane groups or to a different hydrolyzable group by reacting the silicone resin with a silane, disiloxane, or disilazane containing the appropriate terminal group in a process referred to as capping. Silanes containing hydrolyzable groups may be added in molar excess of the quantity required to react with the silicon bonded hydroxyl groups on the polyorganosilicate resin.

When the additional polyorganosilicate resin is (R'-1) the capped resin, the capped may comprise 2 wt % or less, alternatively 0.7 wt % or less, alternatively 0.5 wt %, and alternatively 0.5 wt % to 0.8 wt % of silanol groups. The concentration of silanol groups present in the polyorganosiloxane may be determined using NMR spectroscopy as described above.

Therefore, the additional polyorganosilicate resin (R') may have unit formula $(R^1_3SiO_{1/2})_{b'}(SiO_{4/2})_{c'}(HO_{1/2})_{d'}$, where each $R^1$ is an independently selected alkyl group of 1 to 6 carbon atoms, subscripts b' and c' represent mole fractions of monofunctional and tetrafunctional units, respectively, and subscripts b' and c' have values such that $0.4 \leq b \leq 0.5$, $0.5 \leq c \leq 0.6$, and a quantity (b'+c')=1; subscript d' represents a quantity of hydroxyl groups in the resin, and subscript d' has a value sufficient to provide the resin with a silanol content and Mw as described above. Alternatively, when (R') the additional polyorganosilicate resin comprises or is (R2') the uncapped resin, then Mw may be 15,000 g/mol to 30,000 g/mol, and silanol content may be 3 wt % to 5 wt %.

The amount of (R') the additional polyorganosilicate resin added in step (5) is sufficient to provide a weight ratio $(R^{tot})/(P)$ of 2.27/1 to <3.88/1, alternatively 2.27/1 to 3.0/1, and alternatively 2.9/1 to 3.0/1. In this ratio, ($R^{tot}$) means the sum of the amount of (R) the Resin described above before the condensation reaction in step (1) plus the amount of (R') the additional polyorganosilicate resin added in step (5). The amount of (R') the additional polyorganosilicate resin is sufficient to make $(R^{tot})/(P) > (R)/(P)$, where (P) represents the amount of Polymer described above before the condensation reaction in step (1). Without wishing to be bound by theory, it is thought that $(R^{tot})/(P)$ of <2.27/1 may result in a silicone pressure sensitive adhesive that has insufficient adhesion to silicone rubber, however, $(R^{tot})/(P)$ of $\geq 3.88/1$ may result in a silicone pressure sensitive adhesive that is glassy and also lacks sufficient adhesion to silicone rubber.

The resin/polymer blend produced in step (5) may be used to form a silicone pressure sensitive adhesive composition. Step (6) in the method described above is optional. When step (6) is present, (X) a peroxide crosslinking agent is added in step (6) to form the silicone pressure sensitive adhesive composition, which may cure faster than when the peroxide crosslinking agent is not present, provided other conditions such as temperature are kept constant.

(X) Peroxide Crosslinking Agent

Starting material (X) added when step (6) is present is a peroxide crosslinking agent. The peroxide crosslinking agent may be an organic peroxide or a hydroperoxide, such as benzoyl peroxide; 4-monochlorobenzoyl peroxide; t-butylperoctoate; t-butyl peroxybenzoate, tert-butylperoxybenzoate, tert-butyl cumyl peroxide, tert-butyloxide 2,5-dimethyl-2,5-di-tert-butylperoxyhexane; 2,4-dichlorobenzoyl peroxide; di-tertbutylperoxy-diisopropyl benzene; 1,1-bis(tert-butylperoxy)-3,3,5-trimethylcyclohexane; 2,5-di-tert-butylperoxyhexane-3,2,5-dimethyl-2,5-bis(tert-butylperoxy) hexane; cumyl-tert-butyl peroxide; dicumyl peroxide; di-t-butyl peroxide; t-butyl hydroperoxide; cumene hydroperoxide; di-t-amyl peroxide; and combinations of two or more thereof. Additionally, di-peroxide peroxide crosslinking agents may be used alone or in combination with other di-peroxide crosslinking agents. Such di-peroxide peroxide crosslinking agents include, but are not limited to, 1,4-bis-(t-butyl peroxycarbo)cyclohexane; 1,2-di(t-butyl peroxy)cyclohexane; and 2,5-di(t-butyl peroxy)-3-hexyne. Suitable peroxide crosslinking agents for use as starting material (X) are known in the art and are commercially available from various sources, such as Sigma-Aldrich, Inc. of St. Louis, Missouri, USA.

Starting material (X) may comprise one peroxide crosslinking agent or a combination of two or more peroxide crosslinking agents. The amount of starting material (X) added in step (5) depends on various factors including the type and amount of peroxide crosslinking agent selected and the selection of (P) the Polymer, (R) the Resin, and (R') the additional polyorganosilicate resin, however, the amount of peroxide crosslinking agent, when present, may be 0.1 weight % to 4 weight %, alternatively 1 weight % to 4 weight %, and alternatively 2 weight % to 3 weight %, based on combined weights of starting materials (P), (R), (R'), (C), and (S).

Step (7) in the method described herein is optional. However, step (7) may be included in the method to improve bonding of the silicone pressure sensitive adhesive to the backing substrate. Therefore, the method for forming the adhesive article may optionally further comprise (7) treating a surface of the backing substrate before applying the silicone pressure sensitive adhesive composition. Treating the surface may be performed by any convenient means, such as applying a primer, or subjecting the surface to corona-discharge treatment, etching, or plasma treatment before applying the silicone pressure sensitive adhesive composition to the surface. Alternatively, treating the surface may comprise applying a primer to the surface of the backing substrate.

Step (8), coating the silicone pressure sensitive adhesive composition on the surface of the backing substrate can be performed by any convenient means. For example, the silicone pressure sensitive adhesive composition may be applied by gravure coater, comma coater, offset coater, offset-gravure coater, roller coater, reverse-roller coater, air-knife coater, slot die, or curtain coater.

In the method described herein, steps (8) to (10) may be performed via wet casting or via dry casting. In wet casting, the silicone pressure sensitive adhesive layer may be permanently adhered to the backing substrate, such as the polymeric films and/or foams described below.

The backing substrate can be any material that can withstand the curing conditions used in step (10) to cure the silicone pressure sensitive adhesive composition to form the silicone pressure sensitive adhesive on the surface of the backing substrate. For example, any backing substrate that can withstand heat treatment at a temperature equal to or greater than 120° C., alternatively 150° C. is suitable. Examples of materials suitable for such backing substrates including polymeric films and/or foams, which may be comprised of polyimide (PI), polyetheretherketone (PEEK), polyethylene naphthalate (PEN), liquid-crystal polyarylate, polyamideimide (PAI), polyether sulfide (PES), polyethylene terephthalate, polyester (PET), polycarbonate (PC), polymethylmethacrylate (PMMA), thermoplastic polyurethane (TPU), thermoplastic elastomer (TPE), polyethylene (PE), or polypropylene (PP). Alternatively, the backing substrate may be glass. Alternatively, the backing substrate may be a release liner, for example, when the silicone pressure sensitive adhesive will be used in a dry casting method. The thickness of the substrate is not critical; however, the thickness may be 5 µm to 300 µm, alternatively 10 µm to 200 µm. Alternatively, the backing substrate used in step (8) may be selected from the group consisting of PE, PU, TPE, and TPU.

Step (9) of the method comprises drying the silicone pressure sensitive adhesive composition. Drying may be performed by any convenient means, such as heating at a temperature and for a time sufficient to vaporize all or a portion of the solvent but insufficient to fully cure the silicone pressure sensitive adhesive composition. For example, drying may be performed by, e.g., heating at a temperature of 50° C. to 120° C., alternatively 70° C. to 100° C., and alternatively 70° C. to 80° C. for a time sufficient to remove all or a portion of the solvent (e.g., 30 seconds to 1 hour, alternatively 1 minute to 5 minutes).

After drying, the method further comprises step (10), curing the silicone pressure sensitive adhesive composition to form a laminate article comprising a silicone pressure sensitive adhesive layer having a surface adhered to the surface of the backing substrate, where the silicone pressure sensitive adhesive layer further comprises an opposing surface opposite the surface of the backing substrate.

Curing the pressure sensitive adhesive composition in step (10) may be performed by heating at a temperature of 80° C. to 200° C., alternatively 90° C. to 210° C., alternatively 150° C. to 205° C., and alternatively 180° C. to 205° C. for a time sufficient to cure the pressure sensitive adhesive composition (e.g., for 30 seconds to an hour, alternatively 1 to 5 minutes). If cure speed needs to be increased or the process oven temperatures lowered, the amount of (X) the peroxide crosslinking agent can be increased. This forms a silicone pressure sensitive adhesive on the surface of the backing substrate. Curing may be performed by placing the coated backing substrate in an oven. The amount of the silicone pressure sensitive adhesive composition to be coated on the backing substrate depends on the specific application, however, the amount may be sufficient such that, after curing, thickness of the silicone pressure sensitive adhesive may be 5 micrometers to 100 micrometers.

The method described herein may optionally further comprise an additional step after step (10). The additional step comprises applying a removable release liner to the opposing surface of the silicone pressure sensitive adhesive layer opposite the backing substrate, e.g., to protect the silicone pressure sensitive adhesive before use (e.g., when the backing substrate is a polymeric film and/or foam, or glass). The release liner may be applied before, during or after curing the silicone pressure sensitive adhesive composition; alternatively after curing.

The silicone pressure sensitive adhesive prepared in step (10) will adhere to a silicone rubber article. Without wishing to be bound by theory, it is thought that the silicone pressure sensitive adhesive prepared in step (10) may have adhesion to silicone rubber >1,000 gf/in, alternatively >1,200 gf/in, alternatively >1,300 gf/in, and alternatively >1,500 gf/in, while at the same time adhesion may be up to 2,500 gf/in, alternatively up to 2,200 gf/in, alternatively up to 2,000 gf/in, and alternatively up to 1,800 gf/in, when tested according to the peel adhesion test method described in the EXAMPLES, below.

While treatment of the silicone rubber article is not required for this adhesion, the method may optionally further comprise step (11), treating a surface of the silicone rubber article, which may facilitate and/or improve adhesion of the silicone pressure sensitive adhesive to the surface of the silicone rubber article. Treating the surface of the silicone rubber article may be performed by any convenient means, such as cleaning the surface of the silicone rubber, e.g., with an alcohol such as isopropanol, or any of the surface treatments described above in step (7).

The silicone rubber article is not specifically restricted. The silicone rubber article may have a durometer, Shore A, of 30 to 75, alternatively 30 to 50, measured by ASTM D2240. Liquid silicone rubbers (LSRs) and high consistency rubbers (HCRs) may be used for the silicone rubber article. Alternatively, the silicone rubber article may be an LSR. LSRs are known in the art and may be made by known methods, such as those disclosed in U.S. Pat. No. 5,777,002 to Conway, et al. or U.S. Pat. No. 8,198,357 to Jeram, et al. Alternatively, the silicone rubber article may be selected based on the desired end use for the laminate article prepared herein.

For example, optical silicone elastomers (optical LSRs) are known in the art and are described, for example, in U.S. Pat. No. 8,859,693 to Hasegawa, et al. and U.S. Pat. No. 8,853,332 to Akitomo, et al. Optical LSRs are commercially available. For example, optical LSRs include SILASTIC™ MS-1001, MS-1002, MS-1003, MS-4001, MS-4002, and MS-4007, which are moldable optical silicone elastomers, and SYLGARD™ 182, 184, and 186 are other optical silicone elastomers, all of which are commercially available from DSC.

Alternatively, an LSR such as, XIAMETER™ RBL-2004-30, XIAMETER™ RBL-2004-50 SILASTIC™ 9202-50 LSR, SILASTIC™ LCF 3760, and SILASTIC™ LCF 3600, or an HCR such as Varox™ DBPH-50 from TDCC, or SILASTIC™ RBC 7600-50, XIAMETER™ RBB 2000-35, XIAMETER™ RBB 2001-65, XIAMETER™ RBB-2030-40EN, XIAMETER™ RBB-6660-60EN, XIAMETER™ RBB-2002-30 Base, XIAMETER™ RBB-2004-60, or XIAMETER™ RBB-2220-70, each from DSC, may be used.

The method described herein further comprises step (12), adhering the opposing surface of silicone pressure sensitive adhesive, as described in step (10), and the surface of the silicone rubber article. Step (12) may be performed by any convenient means, such as contacting the surface of the silicone rubber article and the opposing surface of the silicone pressure sensitive adhesive and applying pressure. If a release liner is used to protect the opposing surface of the silicone pressure sensitive adhesive, the release liner is removed before contacting the surface of the silicone rubber article and the opposing surface of the silicone pressure sensitive adhesive. The resulting product prepared in step (12) is a laminate article. In the method comprising wet casting, described above, the laminate article may comprise a backing substrate selected from a polymeric film, a polymeric foam or glass; the silicone pressure sensitive adhesive described above, and a silicone rubber article.

Alternatively, when dry casting is used in steps (8) to (10) described above, the backing substrate comprises a release liner. The release liner may be removed after step (10) to form the silicone pressure sensitive adhesive layer as a free standing film. Alternatively, the release liner may be removed after step (12). When dry casting is performed, the method may further comprise:

optionally (13) treating a surface of a second silicone rubber article; and

(14) adhering the surface of the silicone pressure sensitive adhesive layer (exposed via removal of the release liner) to the surface of the second silicone rubber article.

The second silicone rubber article is as described above for use in step (12). The second silicone rubber article may be the same as the silicone rubber article used in step (12). Alternatively, the second silicone rubber article may be different from the silicone rubber article used in step (12). In this instance, the laminate article formed by the method has a silicone pressure sensitive adhesive layer sandwiched between the silicone rubber article and the second silicone rubber article.

FIG. 1 shows a partial cross section of a laminate article (100) prepared by the method described above. The laminate article (100) includes a silicone pressure sensitive (102) having a surface (102a) and an opposing surface (102b). The opposing surface (102b) of the silicone pressure sensitive (102) adheres to the surface (103a) of the silicone rubber article (103) with a peel adhesion of >1,000 gf/in as measured by the test method described in the EXAMPLES, below. The silicone pressure sensitive (102) may have a thickness of 10 µm to 200 µm. The silicone pressure sensitive (102) adheres to a backing substrate (101) having a surface (101b). The surface (102a) of the silicone pressure sensitive (102) contacts the surface (101b) of the backing substrate (101). The backing substrate (101) is a polymeric film that may be selected from the group consisting of PE, PU, TPU, and TPE, and which may have a thickness of 10 µm to 200 µm. The silicone rubber article (103) may be an LSR, as described above.

The silicone pressure sensitive adhesive composition may be used in fabrication of the laminate article (100) via wet casting. For example, the silicone pressure sensitive adhesive composition may be applied to the surface (101b) of the backing substrate (101) and cured to form the silicone pressure sensitive adhesive (102). Alternatively, the silicone pressure sensitive adhesive composition may be applied to the surface (103a) of the silicone rubber article (103) and cured to form the silicone pressure sensitive adhesive (102). Alternatively, the silicone pressure sensitive adhesive composition may be applied to a surface of a release liner and cured to form the silicone pressure sensitive adhesive (102). Thereafter, the silicone rubber article (103) may be contacted with the opposing surface (102b) of the silicone pressure sensitive adhesive (102) and the surface (101b) of the backing substrate (101) may be contacted with the surface (102a) of the silicone pressure sensitive adhesive (102). Pressure may be applied to adhere the layers of backing substrate (101), silicone pressure sensitive adhesive (102), and silicone rubber article (103) together.

Alternatively, wet casting may be used to prepare a laminate article comprising a backing substrate comprising a silicone rubber and a silicone pressure sensitive adhesive described above, and optionally, a (second) silicone rubber article. In this method, the backing substrate may be a silicone rubber article that is the same as or different from the (second) silicone rubber article used in step (12), described below. Alternatively, the backing substrate may comprise more than one material of construction, such as a mesh (which may be fabricated from a polymeric material, as described above) impregnated with a silicone rubber. This method for fabricating a laminate article comprises:

(1) combining, under conditions to effect condensation reaction, starting materials comprising (P) a bis-hydroxyl-terminated polydiorganosiloxane with a weight average molecular weight of 10,000 g/mol to <200,000 g/mol measured by GPC, where starting material (P) is present in an amount of >20.5 weight % based on combined weights of starting materials (P) and (R);

(R) a hydroxyl-functional polyorganosilicate resin with a weight average molecular weight of 15,000 g/mol to 30,000 g/mol measured by GPC, where starting material (R) is present in an amount <79.5 weight %, based on combined weights of starting materials (P) and (R);

(S) a solvent; and optionally (N) a neutralizer; where starting materials (R) and (P) and are present in a weight ratio (R)/(P) of 0.65/1 to <3.0/1; thereby producing a reaction mixture; and (2) adding (C) a condensation reaction catalyst to the reaction mixture, thereby producing a catalyzed reaction mixture;

(3) mixing the catalyzed reaction mixture at a temperature of 20° C. to 150° C. and removing water; thereby forming a reaction product comprising a condensation reaction product of (P) and (R);

optionally (4) recovering the condensation reaction product of (P) and (R);

(5) adding, to the condensation reaction product, (R') an additional polyorganosilicate resin with a weight average molecular weight of 5,500 g/mol to 30,000 g/mol measured by GPC in an amount sufficient to provide a $(R^{tot})/(P)$ ratio to 2.27/1 to <3.88/1 where $R^{tot}$ represents a sum of amount of (R') and amount of (R) from step (1) and with the proviso that $(R^{tot})/(P) > (R)/(P)$;

optionally (6) adding up to 4 weight %, based on combined weights of (R) and (P), of (X) a peroxide crosslinking agent, thereby forming a silicone pressure sensitive adhesive composition;

optionally (7) treating a surface of a backing substrate comprising silicone rubber;

(8) coating the silicone pressure sensitive adhesive composition on the surface of the backing substrate;

(9) drying the silicone pressure sensitive adhesive composition, and

(10) curing the silicone pressure sensitive adhesive composition to form a silicone pressure sensitive adhesive layer having a surface adhered to the surface of the backing substrate, where the silicone pressure sensitive adhesive layer further comprises an opposing surface opposite the surface of the backing substrate. This method may optionally further comprise:

optionally (11) treating a surface of a silicone rubber article; and

(12) adhering the opposing surface of the silicone pressure sensitive adhesive and the surface of the silicone rubber article.

Figure 2:
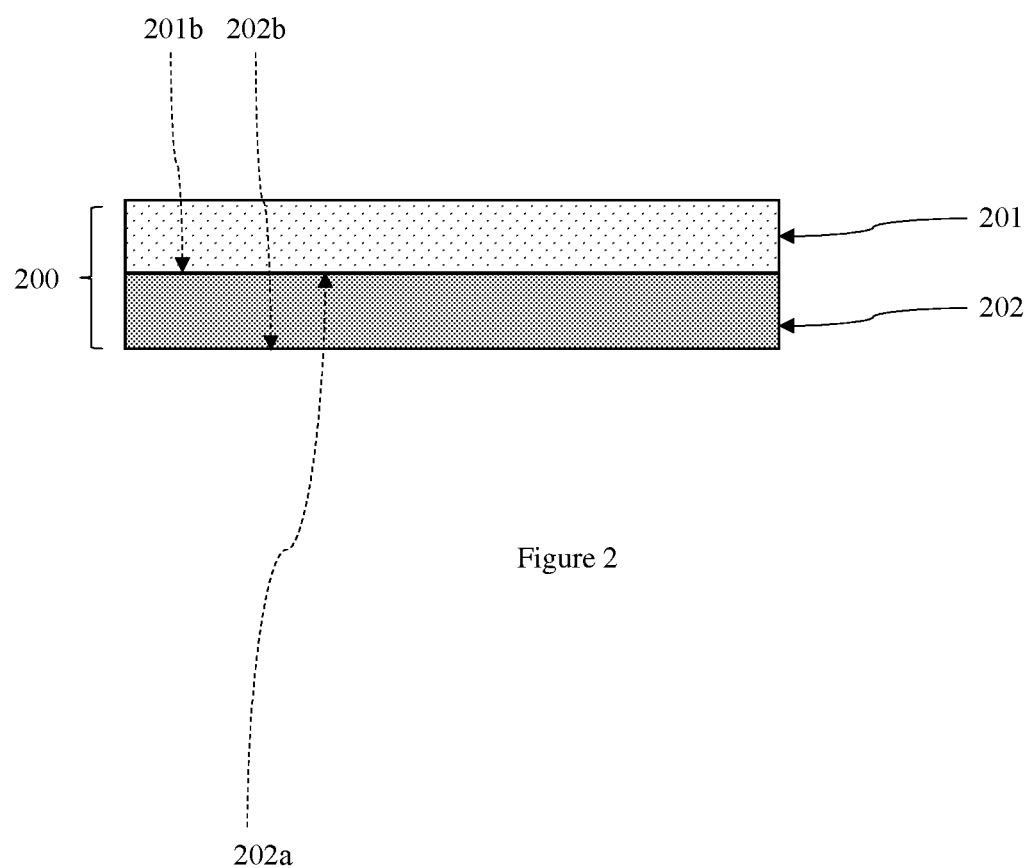
FIG. 2 shows a partial cross section of a laminate article 200.

FIG. 2 shows a partial cross section of a laminate article (200) prepared by the method described above. The laminate article (200) includes a silicone pressure sensitive (202) having a surface (202a) and an opposing surface (202b). The silicone pressure sensitive (202) may have a thickness of 10 µm to 200 µm. The silicone pressure sensitive (202) adheres to a backing substrate comprising silicone rubber (201) and having a surface (201b) with a peel adhesion of >1,000 gf/in as measured by the test method described in the EXAMPLES, below. The surface (202a) of the silicone pressure sensitive (202) contacts the surface (201b) of the backing substrate (201). The backing substrate (201) may be a silicone rubber article such as an LSR or an HCR, as described above. Alternatively, the backing substrate (201) may comprise a mesh impregnated with a silicone rubber.

The silicone pressure sensitive adhesive composition may be used in fabrication of the laminate article (200) via wet casting. For example, the silicone pressure sensitive adhesive composition may be applied to the surface (201b) of the backing substrate (201) and cured to form the silicone pressure sensitive adhesive (202).

EXAMPLES

The following examples are provided to illustrate the invention to one skilled in the art and are not to be construed to limit the scope of the invention set forth in the claims. Starting materials used in these examples are described in Table 1.

TABLE 1

Starting Materials

| Ingredient Type | Chemical Description, Chemical formula, or Structure | Source |
|---|---|---|
| Solvent 1 | Toluene, $PhCH_3$ | TDCC |
| Solvent 2 | Xylene, $(CH_3)_2C_6H_4$ | TDCC |
| MQ Resin 1 in Xylene | 65.73 wt % solid content of unit formula $M_{0.461} Q_{0.539}$. OH: 3.25 wt %. Mw: 5,620 g/mol. | DSC |
| MQ Resin 2 in Xylene | 73.12 wt % solid content of unit formula $M_{0.453} Q_{0.547}$. OH: 3.07 wt %. Mw: 21,350 g/mol. | DSC |
| MQ Resin 3 in Xylene | 73.11 wt % solid content of unit formula $M_{0.454}Q_{0.546}$. OH: 3.13 wt %. Mw: 22,200 g/mol. | DSC |
| MQ Resin 4 in Xylene | 73.17 wt % solid content of unit formula $M_{0.431} Q_{0.569}$. OH: 3.44 wt %. Mw: 29,050 g/mol. | DSC |
| MQ Resin 5 in Xylene | 70.35 wt % solid content of unit formula $M_{0.503} Q_{0.497}$. OH: 0.62 wt %. Mw: 7,510 g/mol. | DSC |
| MQ Resin 6 in Xylene | 70.60 wt % solid content of unit formula $M_{0.477}Q_{0.523}$. OH: 1.12 wt %. Mw: 17,600 g/mol. | DSC |
| MQ Resin 7 in Xylene | 75.65 wt % solid content of unit formula $M_{0.482}Q_{0.518}$. OH: 1.08 wt %. Mw: 16,500 g/mol. | DSC |
| PDMS polymer | Bis-hydroxyl-terminated polydimethylsiloxane with unit formula $HOD_{749}OH$. 100 wt % solid content. Mw: 104,000 g/mol. | DSC |
| Peroxide Crosslinking agent | Benzoyl peroxide of formula $(C_6H_5—C(=O)O—)_2$ | Sigma |
| Condensation Catalyst | Benzoic acid of formula $C_6H_5CO_2H$ | ACROS |
| Neutralizer | A silyl phosphate comprising Bis(Trimethylsilyl) hydrogen phosphate (10%) dissolved in toluene | DSC |
| Commercial PSA | DOWSIL ™ 7406-VLO Adhesive | DSC |
| 30-Durometer LSR | XIAMETER ™ RBL-2004-30 Liquid Silicone Rubber, Part A | DSC |
| 30-Durometer LSR | XIAMETER ™ RBL-2004-30 Liquid Silicone Rubber Part B | DSC |
| 50-Durometer LSR | XIAMETER ™ RBL-2004-50 Liquid Silicone Rubber Part A | DSC |
| 50-Durometer LSR | XIAMETER ™ RBL-2004-50 Liquid Silicone Rubber Part B | DSC |
| Release Liner | Commercially available fluorosilicone release coating on a PET backing substrate | SYL-OFF ™ Q2-7785 Release Coating from DSC |

TDCC means The Dow Chemical Company of Midland, Michigan, USA. DSC means Dow Silicones Corporation of Midland, Michigan USA.

In this Reference Example 1, condensation reaction products (Bodied Resins) were prepared as follows: PDMS polymer, an MQ resin, solvent, and neutralizer were combined in a three neck flask at RT. The contents of the flask were stirred at 250 rpm for 20 minutes using a stainless steel stir paddle in the middle neck. Condensation Catalyst was then added with stirring. Another neck was connected to a dean-stark trap and then condenser with city water cooling capability. The last neck contained a thermometer and nitrogen sweep adapter closing the system. Finally, the three-neck flask with the mixture inside was mounted on a heating mantle with temperature control and heated to a reaction temperature of 145° C. The reaction continued for 3 hours starting from the beginning of refluxing. Bodied Resins A to E were prepared according to this procedure and are summarized below in Table 2, with the selection and amount of each starting material as defined in Table 1.

TABLE 2

Bodied Resins of Different (R)/(P) Ratios

| Ingredient Type | SI Units | Bodied Resin A | Bodied Resin B | Bodied Resin C | Bodied Resin D | Bodied Resin E |
|---|---|---|---|---|---|---|
| PDMS polymer | g | 50.85 | 59.33 | 67.8 | 84.75 | 101.7 |
| MQ Resin 2 | g | 160.34 | 149.82 | 137.43 | 115.91 | 91.62 |
| Neutralizer | g | 0.03 | 0.03 | 0.03 | 0.03 | 0.03 |
| Condensation Catalyst | g | 0.6 | 0.6 | 0.6 | 0.6 | 0.6 |
| Solvent 2 Calculations | g | 87.89 | 90.24 | 93.85 | 98.71 | 106.05 |
| Resin/polymer ratio | wt/wt | 69.4/30.6 | 64.5/35.5 | 59.3/40.7 | 50/50 | 39.3/60.7 |
| Resin/polymer ratio (normalized) | wt/wt | 2.27/1 | 1.82/1 | 1.46/1 | 1/1 | 0.65/1 |

Table 2 shows the synthesis of bodied resins with different Resin to Polymer ratios, while keeping selection of Polymer and Resin constant.

In this Reference Example 2, starting materials in amounts summarized below in Tables 3 and 4 were added to a dental mixer cup and mixed for 30 seconds at 3500 rpm at RT, until homogeneous. Peroxide Crosslinking agent (in toluene) and Solvent 1 were added to each sample prepared as described above in a dental mixer cup to reach a 50 wt % solid level and a 2 wt % Peroxide Crosslinking agent level. The resulting sample was mixed for 30 seconds at 3500 rpm until homogeneous. Each sample was prepared for application testing by coating on to a 2-mil thick sheet of polyester (PET) using a 3-mil coating bar. Each sheet was then cured in an oven at 80° C. for 2 minutes, followed by 180° C. for 2 minutes. Comparative Examples CE1 to CE6 and Working Examples IE1 to IE12 were prepared according to this Reference Example 2.

In this Reference Example 3, a commercially available peroxide curable silicone pressure sensitive adhesive was evaluated, as supplied in CE7 and with an additional MQ Resin cold blended thereto by mixing for 30 seconds at 3500 rpm under ambient conditions in a dental mixer cup (in CE8 and CE9). Peroxide Crosslinking agent (in toluene) and Solvent 1 were added to each sample prepared as described above in a dental mixer cup to reach a 50 wt % solid level and a 2 wt % Peroxide Crosslinking agent level. The resulting sample was mixed for 30 seconds at 3500 rpm until homogeneous. Each sample was prepared for application testing by coating on to a 2-mil thick sheet of polyester (PET) using a 3-mil coating bar. Each sheet was then cured in an oven at 80° C. for 2 minutes, followed by 180° C. for 2 minutes.

In this Reference Example 4, the liquid silicone rubber (LSR) substrates were from DSC, XIAMETER™ RBL-2004-30 LSR and XIAMETER™ RBL-2004-50 LSR samples. For mixing the Part A and Part B, 100 g of Part A and 100 g of Part B were added in a dental mixer cup and mixed for 3 cycles with each cycle running for 20 seconds at 1800 rpms. The cup was scraped and hand mixed between cycles to ensure material did not stick in the bottom and corners of the dental cup. This mixture was transferred to a polished book mold or Teflon lined chase and cured at 350° F. for 5 minutes.

In this Reference Example 5, Peel Adhesion was measured as follows: Peel adhesion) (180° was tested according to PSTC-101 standards. Each silicone pressure sensitive adhesive coated onto 2-mil polyester film (tape) prepared as described in Reference Examples 2 and 3 was laminated onto the silicone rubber surface typically after 1 day following cure. The silicone rubber surface was wiped with Isopropyl Alcohol to clean the surface and allowed to dry under ambient conditions for 5 minutes before the silicone pressure sensitive adhesive was laminated thereto. After laminating, a 2-kg rubber-coated roller was applied to the resulting article (back and forth five times each) and the article was left undisturbed for a dwell time of 20 minutes at room temperature before the peel adhesion test. A TMI Release and Adhesion Tester was used to pull a 1-inch wide tape from the silicone rubber substrate at 12 inches per minute. The results are shown below in Tables 3 and 4.

TABLE 3

Blending Resins with Bodied PSAs of Different (R)/(P).

| Starting Material (from Table 1 or Table 2) | Unit | CE1 | IE1 | IE2 | IE3 | IE4 | IE5 | CE2 | CE3 | CE4 | CE5 | CE6 |
|---|---|---|---|---|---|---|---|---|---|---|---|---|
| Bodied Resin A | g | 0 | 0 | 0 | 0 | 0 | 6 | 0 | 0 | 0 | 0 | 0 |
| Bodied Resin B | g | 0 | 0 | 0 | 0 | 5 | 0 | 0 | 0 | 0 | 0 | 0 |
| Bodied Resin C | g | 0 | 0 | 0 | 8 | 0 | 0 | 0 | 0 | 0 | 0 | 4 |
| Bodied Resin D | g | 0 | 0 | 4 | 0 | 0 | 0 | 4 | 4 | 4 | 4 | 0 |
| Bodied Resin E | g | 0 | 6 | 0 | 0 | 0 | 0 | 0 | 0 | 0 | 0 | 0 |
| PDMS polymer | g | 1.39 | 0 | 0 | 0 | 0 | 0 | 0 | 0 | 0 | 0 | 0 |
| MQ Resin 1 | g | 0 | 0 | 0 | 0 | 0 | 0 | 3.59 | 0 | 0 | 0 | 0 |
| MQ Resin 2 | g | 5.82 | 6.88 | 3.22 | 3.94 | 1.65 | 1.06 | 0 | 0 | 0 | 0 | 0 |
| MQ Resin 5 | g | 0 | 0 | 0 | 0 | 0 | 0 | 0 | 3.35 | 0 | 0 | 2.06 |
| MQ Resin 6 | g | 0 | 0 | 0 | 0 | 0 | 0 | 0 | 0 | 3.34 | 0 | 0 |
| MQ Resin 7 | g | 0 | 0 | 0 | 0 | 0 | 0 | 0 | 0 | 0 | 3.12 | 0 |
| Calculations |  |  |  |  |  |  |  |  |  |  |  |  |
| Resin/polymer ratio | wt/wt | 75/25 | 75/25 | 75/25 | 75/25 | 75/25 | 75/25 | 75/25 | 75/25 | 75/25 | 75/25 | 75/25 |
| Resin/polymer ratio (normalized) | wt/wt | 3/1 | 3/1 | 3/1 | 3/1 | 3/1 | 3/1 | 3/1 | 3/1 | 3/1 | 3/1 | 3/1 |
| Measurements |  |  |  |  |  |  |  |  |  |  |  |  |
| Peel Adhesion from 30-DurometerLSR | gf/in | 107 ± 31 | 1028 ± 45 | 1289 ± 187 | 1756 ± 125 | 1660 ± 248 | 1925 ± 67 | 648 ± 13 | 352 ± 15 | 727 ± 24 | 774 ± 98 | 668 ± 21 |
| Peel Adhesion from 50-DurometerLSR | gf/in | 29 ± 6 | 1227 ± 83 | 1683 ± 118 | 1632 ± 107 | 1382 ± 80 | 2453 ± 110 | 719 ± 41 | 139 ± 17 | 1204 ± 73 | 649 ± 96 | 648 ± 34 |

Working IE1 to IE5 show that combining an additional polyorganosilicate resin (Resin 2, with Mw 21,350 g/mol, OH content 3.07 wt %) with bodied resins with (R)/(P) ratios of 0.65/1 to 2.27/1 increased the adhesion to both 30 Durometer LSR and 50 Durometer LSR to >1,000 g/inch of each sample under the conditions tested. Higher (R)/(P) ratio in the bodied resin of IE5 produced higher adhesion after adding the additional resin. Different additional resins (with varying Mw and OH levels) were added to the same bodied resin in samples CE2 to CE5; and in sample CE6. Adding resins with lower Mw or lower levels of OH content did not lead to strong adhesion to LSRs. For bodied resin with a (R)/(P) ratio of 1/1, adding resins with low Mw (CE2) or low OH level (as shown in samples CE3 to CE5) did not lead to strong adhesion to LSRs (<1,000 g/inch). For bodied resins with a (R)/(P) ratio of 1.46/1, adding an additional resin with low Mw and low OH level (as shown in sample CE6) did not lead to strong adhesion to LSRs (<1,000 g/inch).

TABLE 4

| Starting Material (from Table 1 or Table 2) | Unit | IE6 | IE7 | IE8 | IE9 | IE10 | IE11 | IE12 | CE7 | CE8 | CE9 |
|---|---|---|---|---|---|---|---|---|---|---|---|
| Bodied Resin C | g | 0 | 0 | 4 | 4 | 4 | 4 | 4 | 0 | 0 | 0 |
| Bodied Resin D | g | 4 | 4 | 0 | 0 | 0 | 0 | 0 | 0 | 0 | 0 |
| Commercial PSA | 0 | 0 | 0 | 0 | 0 | 0 | 0 | 0 | 15 | 5 | 5 |
| MQ Resin 1 | g | 0 | 0 | 2.11 | 0 | 0 | 0 | 0 | 0 | 0 | 0 |
| MQ Resin 3 | g | 3.22 | 0 | 0 | 0 | 2.00 | 0 | 0 | 0 | 3.39 | 0 |
| MQ Resin 4 | g | 0 | 3.22 | 0 | 0 | 0 | 0 | 1.99 | 0 | 0 | 0 |
| MQ Resin 6 | g | 0 | 0 | 0 | 2.07 | 0 | 0 | 0 | 0 | 0 | 0 |
| MQ Resin 7 | g | 0 | 0 | 0 | 0 | 0 | 1.93 | 0 | 0 | 0 | 3.3 |
| Calculations | | | | | | | | | | | |
| Resin/polymer ratio | wt/wt | 75/25 | 75/25 | 75/25 | 75/25 | 75/25 | 75/25 | 75/25 | ND | 75/25 | 75/25 |
| Resin/polymer ratio (normalized) | wt/wt | 3/1 | 3/1 | 3/1 | 3/1 | 3/1 | 3/1 | 3/1 | ND | 3/1 | 3/1 |
| Measurements | | | | | | | | | | | |
| Peel Adhesion from 30-Durometer LSR | gf/in | 1492 ± 94 | 1179 ± 237 | 1007 ± 59 | 1588 ± 249 | 1358 ± 95 | 1464 ± 128 | 1460 ± 68 | 269 ± 28 | 835 ± 78 | 543 ± 24 |
| Peel Adhesion from 50-Durometer LSR | gf/in | 1748 ± 98 | 1299 ± 64 | 1485 ± 79 | 1073 ± 280 | 2116 ± 180 | 1410 ± 82 | 2474 ± 104 | 499 ± 14 | 1325 ± 103 | 760 ± 24 |

Different additional resins (with varying Mw and OH level) were added to the same bodied resin in samples IE6 and IE7; and in each of samples IE8 to IE12. Adding resins with higher Mw or higher levels of OH content led to higher adhesion to LSRs. For bodied resin with a (R)/(P) ratio of 1/1, adding resins with high Mw and high OH level (as shown in samples IE2, IE6, and IE7) led to strong adhesion to LSRs (>1,000 g/inch). For bodied resins with a (R)/(P) ratio of 1.46/1, adding an additional resin with high Mw (as shown in samples IE3, IE9, IE10, IE11, and IE12) or high OH level (as shown in sample IE8) led to strong adhesion to LSRs (>1,000 g/inch).

Comparatives CE8 and CE9 showed that when an additional resin was added to a commercially available peroxide curable silicone pressure sensitive adhesive composition (CE7), adhesion (of the silicone pressure sensitive adhesive prepared by curing said composition) to silicone rubber was still <1,000 gf/in on at least one substrate.

In this Reference Example 6, samples of laminate articles were prepared in a method involving wet casting (method 2) as follows:

1. Samples of silicone pressure sensitive adhesive compositions were prepared by mixing Peroxide Crosslinking agent (in toluene) and solvent 1 and each of composition IE10 and a commercial PSA (7406-VLO, CE7) (prepared as described above) in a dental mixer cup to reach a 50 wt % solid level and a 2 wt % Peroxide Crosslinking agent level. Each resulting sample was mixed for 30 seconds at 3500 rpm until homogeneous.
2. Two sheets of silicone rubber substrate (a 50-Durometer LSR) were prepared as described above in Reference Example 4. A surface of each silicone rubber substrate was cleaned by wiping with isopropyl alcohol and allowing to dry under ambient conditions for 5 minutes.
3. Each sample of a silicone pressure sensitive adhesive composition was coated on a cleaned surface of a silicone rubber substrate using a 3-mil coating bar. Each coated substrate was then placed in an oven at 80° C. for 2 minutes, followed by 180° C. for 2 minutes to prepare a laminate of (cured) silicone pressure sensitive adhesive layer on each silicone rubber sheet.
4. Two additional sheets of silicone rubber substrate (50-Durometer LSR) were prepared as described above in Reference Example 4. A surface of each silicone rubber substrate was cleaned by wiping with isopropyl alcohol and allowing to dry under ambient conditions for 5 minutes.
5. One day following step 3, the surface of each silicone pressure sensitive adhesive layer was contacted with the cleaned surface of each silicone rubber substrate from step 4. A 2-kg rubber-coated roller was applied to the resulting article (back and forth five times each), and the article was left undisturbed for a dwell time of 20 minutes at room temperature before the peel adhesion test according to PSTC-101 standards, as described above, except using a silicone rubber substrate as the backing substrate (instead of polyester film), was performed. A TMI Release and Adhesion Tester was used to pull a 1-inch wide tape from the silicone rubber substrate at 12 inches per minute. Peel adhesion test results are shown below in Table 5.

TABLE 5

Peel Adhesion Test Results for Laminate Articles Prepared According to Reference Example 6 (Wet Casting)

| Measurement | Units | IE10 | CE7 (7406-VLO) |
|---|---|---|---|
| Peel Adhesion from 50-Durometer LSR | gf/in | 1868 ± 86 | 228 ± 8 |

The results in Table 5 show that when a silicone pressure sensitive adhesive is adhered to a silicone rubber article used as the backing substrate via wet casting (Method 2), the silicone pressure sensitive adhesive has higher peel adhesion than a commercial PSA (CE7).

In this Reference Example 7, samples of laminate articles were prepared by a method including dry casting (Method 3) as follows:

1. Two samples of silicone pressure sensitive adhesive compositions were prepared by mixing Peroxide Crosslinking agent (in toluene) and solvent 1 and each of composition IE10 and a commercial PSA (7406-VLO, CE7) (prepared as described above) in a dental mixer cup to reach a 50 wt % solid level and a 2 wt % Peroxide Crosslinking agent level. Each resulting sample was mixed for 30 seconds at 3500 rpm until homogeneous.
2. Each sample of a silicone pressure sensitive adhesive composition was coated on a fluorosilicone release liner using a 3-mil coating bar. Each coated liner was then placed in an oven at 80° C. for 2 minutes, followed by 180° C. for 2 minutes to prepare a laminate of (cured) silicone pressure sensitive adhesive layer on each fluorosilicone release liner. Each laminate was aged for 1 day at RT.

3. Two sheets of silicone rubber substrates (50-Durometer LSR) were prepared as described above in Reference Example 4. A surface of each silicone rubber substrate was cleaned by wiping with isopropyl alcohol and allowing to dry under ambient conditions for 5 minutes.
4. The surface of each silicone pressure sensitive adhesive layer from step 2 was contacted with the cleaned surface of each silicone rubber substrate from step 3.
5. Two sheets of silicone rubber substrate (50-Durometer LSR) were prepared as described above in Reference Example 4. A surface of each silicone rubber substrate was cleaned by wiping with isopropyl alcohol and allowing to dry under ambient conditions for 5 minutes.
6. One day following step 4, the fluorosilicone release liner was removed from each laminate, and the resulting exposed surface of each silicone pressure sensitive adhesive layer was contacted with the cleaned surface of a silicone rubber substrate from step 5. A 2-kg rubber-coated roller was applied to the resulting article (back and forth five times each), and the article was left undisturbed for a dwell time of 20 minutes at room temperature before the peel adhesion test according to PSTC-101 standards, as described above, except using a silicone rubber substrate (instead of polyester film), was performed. A TMI Release and Adhesion Tester was used to pull a 1-inch wide tape from the silicone rubber substrate at 12 inches per minute. Peel adhesion test results are shown below in Table 6.

TABLE 6

Peel Adhesion Test Results for Laminate Articles Prepared According to Reference Example 7 (Dry Casting)

| Measurement | Units | IE10 | CE7 (7406-VLO) |
|---|---|---|---|
| Peel Adhesion from 50-Durometer LSR | gf/in | 794 ± 33 | 321 ± 7 |

The results in Table 6 show that when a silicone pressure sensitive adhesive is adhered to a silicone rubber article via dry casting (Method 3), the silicone pressure sensitive adhesive has higher peel adhesion than a commercial PSA (CE7).

Definitions and Usage of Terms

All amounts, ratios, and percentages are by weight unless otherwise indicated. The amounts of all starting materials in a composition total 100% by weight. The Summary and the Abstract are hereby incorporated by reference. The articles 'a', 'an', and 'the' each refer to one or more, unless otherwise indicated by the context of specification. The singular includes the plural unless otherwise indicated. The term "comprising" and derivatives thereof, such as "comprise" and "comprises" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Abbreviations used herein are defined in Table 7.

TABLE 7

Abbreviations

| Abbreviation | Definition |
|---|---|
| ° C. | Degrees Celsius |
| COD | cyclooctadiene |
| cSt | centistokes |
| D | a difunctional siloxane unit of formula ($Me_2SiO_{2/2}$) |
| DP | average degree of polymerization |
| DSC | Dow Silicones Corporation of Midland, Michigan, USA |
| g | gram |
| gf/in | gram force per inch |
| GPC | Gel permeation chromatography |
| HCR | high consistency rubber |
| in | inch |
| LSR | liquid silicone rubber |
| m | meter |
| M | a monofunctional siloxane unit of formula ($Me_3SiO_{1/2}$) |
| Me | methyl |
| mg | milligram |
| min | minutes |
| mL | milliliter |
| Mn | number average molecular weight |
| mol | mole |
| mPa · s | milli Pascal seconds |
| Mw | weight average molecular weight measured by GPC |
| ND | Not Determined |
| PDMS | polydimethylsiloxane |
| Ph | phenyl |
| Q | a tetrafunctional siloxane unit of formula ($SiO_{4/2}$) |
| RF | release force |
| rpm | Revolutions per minute |
| RT | room temperature of 25 ± 2° C. |
| TDCC | The Dow Chemical Company of Midland, Michigan, USA |
| um or μm | micrometer |
| Vi | vinyl |
| wt | weight |

The Mn, Mw, and molecular weight distribution of the Polymer and condensation reaction product may be determined by GPC using an Agilent Technologies 1260 Infinity chromatograph and toluene as a solvent. The instrument is equipped with two PLgel Mixed C columns. Calibration was made using polystyrene standards. Samples were made by dissolving polymer in toluene (~10 mg/mL) and then immediately analyzing the material by GPC (1 mL/min flow and 45° C. column temperature).

The Mn, Mw, and molecular weight distribution of the Resin may be determined by GPC using an Agilent Technologies 1260 Infinity chromatograph and ethyl acetate as a solvent. The instrument is equipped with two columns, Agilent PLgel Mixed-D and PLgel Mixed-E columns. Calibration was made using polystyrene standards. Samples were made by dissolving polymer in toluene (~20 mg/mL) and then immediately analyzing the material by GPC (1 mL/min flow and 35° C. column temperature).

The invention claimed is:

1. A method for fabricating a laminate article, the method comprising:
 (1) combining, under conditions to effect condensation reaction, starting materials comprising (P) a bis-hydroxyl-terminated polydiorganosiloxane with a weight average molecular weight of 10,000 g/mol to <200,000 g/mol measured by GPC, where starting material (P) is present in an amount of >20.5 weight % based on combined weights of starting materials (P) and (R);

(R) a hydroxyl-functional polyorganosilicate resin with a weight average molecular weight of 15,000 g/mol to 30,000 g/mol measured by GPC, where starting material (R) is present in an amount <79.5 weight %, based on combined weights of starting materials (P) and (R);

(S) a solvent; and optionally (N) a neutralizer; where starting materials (R) and (P) and are present in a weight ratio (R)/(P) of 0.65/1 to <3.0/1; thereby producing a reaction mixture; and (2) adding (C) a condensation reaction catalyst to the reaction mixture, thereby producing a catalyzed reaction mixture;

(3) mixing the catalyzed reaction mixture at a temperature of 20° C. to 150° C. and removing water, thereby forming a reaction product comprising a condensation reaction product of (P) and (R);

optionally (4) recovering the condensation reaction product of (P) and (R);

(5) adding, to the condensation reaction product, (R') an additional polyorganosilicate resin with a weight average molecular weight of 5,500 g/mol to 30,000 g/mol measured by GPC in an amount sufficient to provide a $(R^{tot})/(P)$ ratio to 2.27/1 to <3.88/1 where $R^{tot}$ represents a sum of amount of (R') and amount of (R) from step (1) and with the proviso that $(R^{tot})/(P) > (R)/(P)$;

optionally (6) adding up to 4 weight %, based on combined weights of (R), (R'), and (P), of (X) a peroxide crosslinking agent, thereby forming a silicone pressure sensitive adhesive composition;

optionally (7) treating a surface of a backing substrate;

(8) coating the silicone pressure sensitive adhesive composition on the surface of the backing substrate;

(9) drying the silicone pressure sensitive adhesive composition;

(10) curing the silicone pressure sensitive adhesive composition to form a silicone pressure sensitive adhesive layer having a surface adhered to the surface of the backing substrate, where the silicone pressure sensitive adhesive layer further comprises an opposing surface opposite the surface of the backing substrate;

optionally (11) treating a surface of a silicone rubber article; and

(12) adhering the opposing surface of the silicone pressure sensitive adhesive and the surface of the silicone rubber article.

2. The method of claim 1, where starting material (P), the bis-hydroxyl-terminated polydiorganosiloxane, has formula

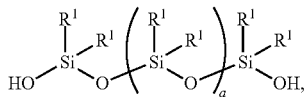

where each $R^1$ is an independently selected alkyl group of 1 to 6 carbon atoms, and subscript a represents average number of difunctional siloxane units per molecule, and $250 \leq a \leq 3,000$.

3. The method of claim 1, where starting material (R), the hydroxyl-functional polyorganosilicate resin, has unit formula $(R^1_3SiO_{1/2})_b(SiO_{4/2})_c(HO_{1/2})_d$, where each $R^1$ is an independently selected alkyl group of 1 to 6 carbon atoms, subscripts b and c represent mole fractions of monofunctional and tetrafunctional units, respectively, and subscripts b and c have values such that $0.4 \leq b \leq 0.5$, $0.5 \leq c \leq 0.6$, and a quantity (b+c)=1; subscript d represents a quantity of hydroxyl groups in the resin, and subscript d has a value sufficient to provide the resin with a hydroxyl content of 2 weight % to 5 weight %.

4. The method of claim 1, where (R)/(P) is 0.65/1 to 1.82/1.

5. The method of claim 1, where (N) the neutralizer is present and, the neutralizer comprises a silyl phosphate.

6. The method of claim 1, where (C) the condensation reaction catalyst is an acid.

7. The method of claim 1, where (R') the additional polyorganosilicate resin has unit formula $(R^1_3SiO_{1/2})_{b'}(SiO_{4/2})_{c'}(HO_{1/2})_{d'}$, where each $R^1$ is an independently selected alkyl group of 1 to 6 carbon atoms, subscripts b' and c' represent mole fractions of monofunctional and tetrafunctional units, respectively, and subscripts b' and c' have values such that $0.4 \leq b \leq 0.5$, $0.5 \leq c \leq 0.6$, and a quantity (b'+c')=1; subscript d' represents a quantity of hydroxyl groups in the resin, and subscript d' has a value sufficient to provide the resin with a hydroxyl content of 0.5 weight % to 5 weight %, and wherein the additional polyorganosilicate resin has weight average molecular weight of 5,500 g/mole to 30,000 g/mol measured by GPC.

8. The method of claim 7, where $(R^{tot})/(P)$ ratio is 3/1.

9. The method of claim 1, where step (6) is present, and (X) the peroxide crosslinking agent comprises benzoyl peroxide.

10. The method of claim 1, where step (7) is present, and step (7) comprises applying a primer to the surface of the backing substrate.

11. The method of claim 1, where step (11) is present, and step (11) comprises cleaning the surface of the silicone rubber with an alcohol.

12. The method of claim 1, where in step (12), the silicone rubber has a durometer of 30 to 50.

13. The method of claim 1, where the backing substrate comprises a release liner, and the method further comprises:

removing the release liner after step (10);

optionally (13) treating a surface of a silicone rubber article; and

(14) adhering the surface of the silicone pressure sensitive adhesive layer to the surface of the silicone rubber article.

14. A method for fabricating a laminate article, the method comprising:

(1) combining, under conditions to effect condensation reaction, starting materials comprising (P) a bis-hydroxyl-terminated polydiorganosiloxane with a weight average molecular weight of 10,000 g/mol to <200,000 g/mol measured by GPC, where starting material (P) is present in an amount of >20.5 weight % based on combined weights of starting materials (P) and (R);

(R) a hydroxyl-functional polyorganosilicate resin with a weight average molecular weight of 15,000 g/mol to 30,000 g/mol measured by GPC, where starting material (R) is present in an amount <79.5 weight %, based on combined weights of starting materials (P) and (R);

(S) a solvent; and
optionally (N) a neutralizer; where
starting materials (R) and (P) and are present in a weight ratio (R)/(P) of 0.65/1 to <3.0/1; thereby producing a reaction mixture; and
(2) adding (C) a condensation reaction catalyst to the reaction mixture, thereby producing a catalyzed reaction mixture;
(3) mixing the catalyzed reaction mixture at a temperature of 20° C. to 150° C. and removing water; thereby forming a reaction product comprising a condensation reaction product of (P) and (R);
optionally (4) recovering the condensation reaction product of (P) and (R);
(5) adding, to the condensation reaction product, (R') an additional polyorganosilicate resin with a weight average molecular weight of 5,500 g/mol to 30,000 g/mol measured by GPC in an amount sufficient to provide a $(R^{tot})/(P)$ ratio to 2.27/1 to <3.88/1 where $R^{tot}$ represents a sum of amount of (R') and amount of (R) from step (1) and with the proviso that $(R^{tot})/(P)>(R)/(P)$;
optionally (6) adding up to 4 weight %, based on combined weights of (R) and (P), of (X) a peroxide cross-linking agent, thereby forming a silicone pressure sensitive adhesive composition;
optionally (7) treating a surface of a backing substrate comprising a silicone rubber;
(8) coating the silicone pressure sensitive adhesive composition on the surface of the backing substrate;
(9) drying the silicone pressure sensitive adhesive composition,
(10) curing the silicone pressure sensitive adhesive composition to form a silicone pressure sensitive adhesive layer having a surface adhered to the surface of the backing substrate, where the silicone pressure sensitive adhesive layer further comprises an opposing surface opposite the surface of the backing substrate;
optionally (10) treating a surface of a silicone rubber article; and
optionally (11) adhering the opposing surface of silicone pressure sensitive adhesive layer and the surface of the silicone rubber article.

15. The method of claim 14, where starting material (P), the bis-hydroxyl-terminated polydiorganosiloxane, has formula

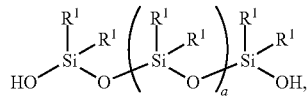

where each $R^1$ is an independently selected alkyl group of 1 to 6 carbon atoms, and subscript a represents average number of difunctional siloxane units per molecule, and $250 \leq a \leq 3,000$.

16. The method of claim 14, where starting material (R), the hydroxyl-functional polyorganosilicate resin, has unit formula $(R^1_3SiO_{1/2})_b(SiO_{4/2})_c(HO_{1/2})_d$, where each $R^1$ is an independently selected alkyl group of 1 to 6 carbon atoms, subscripts b and c represent mole fractions of monofunctional and tetrafunctional units, respectively, and subscripts b and c have values such that $0.4 \leq b \leq 0.5$, $0.5 \leq c \leq 0.6$, and a quantity $(b+c)=1$; subscript d represents a quantity of hydroxyl groups in the resin, and subscript d has a value sufficient to provide the resin with a hydroxyl content of 2 weight % to 5 weight %.

17. The method of claim 14, where (R)/(P) is 0.65/1 to 1.82/1.

18. The method of claim 14, where (N) the neutralizer is present and, the neutralizer comprises a silyl phosphate.

19. The method of claim 14, where (R') the additional polyorganosilicate resin has unit formula $(R^1_3SiO_{1/2})_{b'}(SiO_{4/2})_{c'}(HO_{1/2})_{d'}$, where each $R^1$ is an independently selected alkyl group of 1 to 6 carbon atoms, subscripts b' and c' represent mole fractions of monofunctional and tetrafunctional units, respectively, and subscripts b' and c' have values such that $0.4 \leq b \leq 0.5$, $0.5 \leq c \leq 0.6$, and a quantity $(b'+c')=1$; subscript d' represents a quantity of hydroxyl groups in the resin, and subscript d' has a value sufficient to provide the resin with a hydroxyl content of 0.5 weight % to 5 weight %, and wherein the additional polyorganosilicate resin has weight average molecular weight of 5,500 g/mole to 30,000 g/mol measured by GPC.

20. The method of claim 19, where $(R^{tot})/(P)$ ratio is 3/1.

* * * * *